United States Patent [19]

Brock

[11] 4,375,724
[45] Mar. 8, 1983

[54] PIPE ALIGNING APPARATUS

[76] Inventor: Jimmy M. Brock, 800 Hwy. 3 South, League City, Tex. 77573

[21] Appl. No.: 266,797

[22] Filed: May 26, 1981

[51] Int. Cl.³ .............................................. G01B 3/56
[52] U.S. Cl. .................... 33/180 R; 33/173; 33/174 N; 33/174 E; 33/174 M
[58] Field of Search ................ 33/173, 174 R, 174 C, 33/174 E, 174 Q, 174 M, 174 N, 174 P, 174 PA, 479–481, 412, 180 R, 181 R, 474, 375, 403

[56] References Cited

U.S. PATENT DOCUMENTS

| 183,387 | 10/1976 | Essex | 33/474 |
|---|---|---|---|
| 315,264 | 4/1885 | Euinton | 33/375 X |
| 2,832,152 | 4/1958 | Blackshaw | 33/174 |
| 2,972,816 | 2/1961 | Richardson | 33/189 |
| 3,670,418 | 6/1972 | Hamilton | 33/403 |
| 3,688,412 | 9/1972 | Keener | 33/474 X |
| 4,034,943 | 7/1977 | Freeman | 33/474 X |
| 4,096,634 | 6/1978 | Gudel | 33/174 M X |

OTHER PUBLICATIONS

American Machinist–"Surface Inspection etc.", p. 125, vol. 100 #7, 3/26/56.

Primary Examiner—Harry N. Haroian
Attorney, Agent, or Firm—Dority & Flint

[57] ABSTRACT

The invention relates to apparatus for use in aligning sections of pipe with respect to each other, and more particularly to aligning two sections of pipe 30 and 32 at a predetermined angle with respect to each other so that a joint between the pipe sections may be formed by welding and the like. The apparatus includes gauge devices 16 and 18 which slidably fit upon a leg 14 of a tool 10 having a second angularly oriented leg 12 such as a carpenter's square. Each gauge device includes a vertically movable gauge element 26 having gauge indicia 34 carried thereon. The gauge element 26 is advantageously in the form of a spring-loaded plunger which may be maintained within a bore 40 of the gauge device. Means for locking the gauge device in a spaced-apart relation is provided by wing nuts 22 and 24.

7 Claims, 4 Drawing Figures

PIPE ALIGNING APPARATUS

BACKGROUND OF THE INVENTION

In running and fitting pipe lines for large plant layouts such as petrochemical plants, it is often necessary to join two straight sections of pipe together in an angular orientation by use of an elbow or like fitting such as a ninety degree elbow where the two straight sections are welded to the elbow fitting. The pipe sections are often of a large diameter such as six or twelve inches and are very troublesome to precisely align for welding without the assistance of several persons. The precise orientation of the pipe sections is required to assure a delivery of fluid through the pipe line which is often required to have a precise amount of fall.

Heretofore, devices have been proposed such as in U.S. Pat. Nos. 2,972,816 and 2,832,152 for laying out and aligning pipe. However, these devices are relatively complex in their construction and awkward to use.

Accordingly, an important object of the present invention is to provide practical apparatus for use in aligning straight sections of pipe in a predisposed angular orientation prior to fitting and welding.

Still another important object of the present invention is to provide a device which may be utilized to align straight sections of pipe in a predisposed perpendicular orientation or off-perpendicular orientation.

Still another important object of the present invention is to provide a device for aligning straight sections of pipe in a predisposed angular orientation which may be easily operated and used in the field and which requires a minimum number of persons in the process and thus saves in labor while affording precision pipe layout.

SUMMARY OF THE INVENTION

The above objectives are accomplished according to the present invention by the provision of apparatus which may attach to a conventional carpenter's square or the like tool having a pair of legs which are angularly disposed with respect to one another. The apparatus includes a pair of gauge devices which are slidably attached to a leg of the square and include vertically reciprocal gauge elements having indicia carried thereon which indicates the angular orientation of a first straight pipe section when the remaining leg of the square is against a second straight pipe section. In this manner, a simple and convenient device is provided which facilitates pipe alignment and welding in an efficient manner by a minimum number of pipe fitters. By reading the indicia on the reciprocating gauge elements, any desired angular alignment between the two pipe sections may be determined and held while the pipe is welded to a joint fitting.

BRIEF DESCRIPTION OF THE DRAWING

The construction designated to carry out the invention will be hereinafter described, together with other features thereof.

The invention will be more readily understood from a reading of the following specification and by reference to the accompanying drawing forming a part thereof, wherein an example of the invention is shown and wherein.

DESCRIPTION OF A PREFERRED EMBODIMENT

Figure 1:
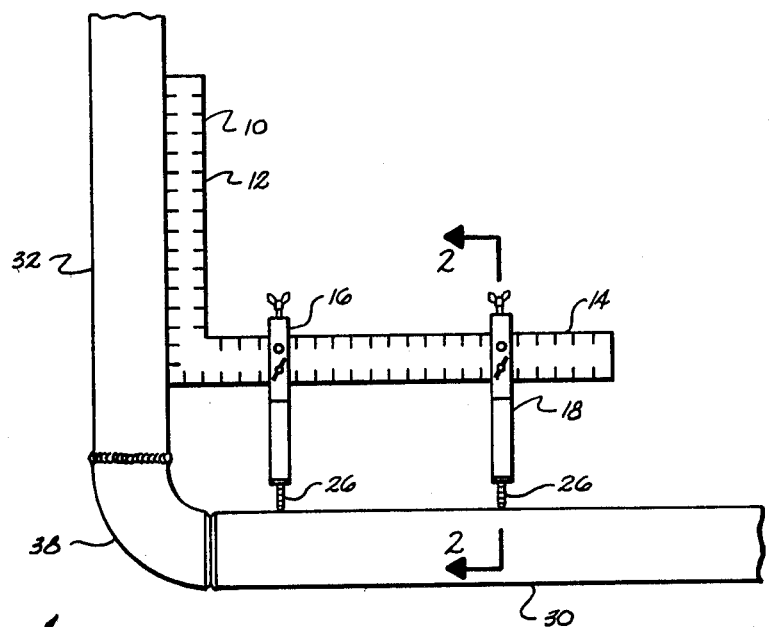
FIG. 1 illustrates apparatus according to the present invention for aligning a pair of straight pipe sections in a desired angular orientation with respect to one another.

Referring now in more detail to the drawing, apparatus is illustrated for use with a conventional carpenter's square 10 or the like tool which includes at least two legs which are angularly oriented with respect to one another such as legs 12 and 14 which are perpendicular to one another. Other tools may also be utilized which have legs disposed at other angular orientations such as a forty-five degree square according to the application being made.

Figure 2:
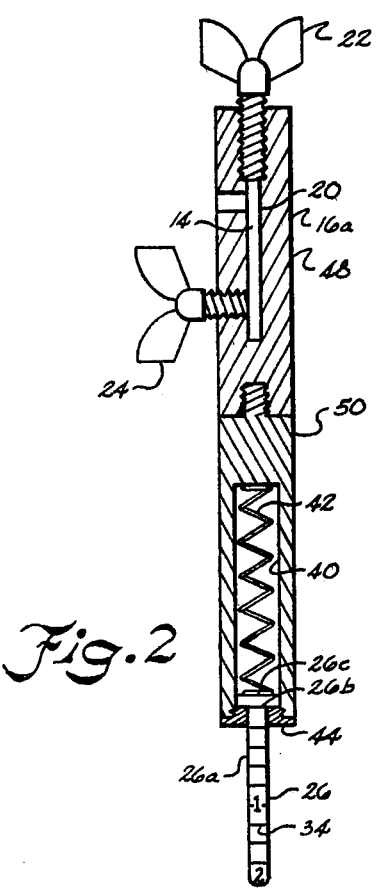
FIG. 2 is a sectional view taken along line 2—2 of FIG. 1.

As illustrated, apparatus according to the invention includes a pair of gauge devices 16 and 18 which are identical and include means for slidably mounting the devices to a leg of the square such as leg 14. Means for slidably attaching the gauge devices includes a slot 20 which receives the leg 14 of the square as can best be seen in reference to the gauge device 16 illustrated in FIG. 2. It being understood throughout the description that an identical construction is had for the device 18 as referenced to device 16. Means for locking the device in a desired position on the leg 14 is provided by set screws 22 and 24 which lock the device with respect to longitudinal and lateral movement along the leg 14 so that there is no play between the device and the leg which would alter the precise measurement and alignment afforded by the device.

Each gauge device includes a vertically movable gauge element 26 which engages a first pipe section 30 in use while the leg 12 of the square lies against a second pipe section 32. Indicia means 34 is carried by the gauge element 26. The indicia serves as an indication by which the angular alignment of the pipe sections relative to one another may be gauged and determined. With the desired alignment between the pipe sections being had, a joint may be formed to fix the pipe sections in the angular orientation such as by means of welding the pipe sections 30 and 32 to an elbow fitting 38. As illustrated, the elbow is a ninety degree elbow fitting.

Figure 3:
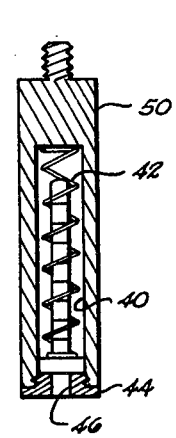
FIG. 3 is a sectional view of a gauge device according to the present invention in which the gauging element is concealed within the device when not in use.
Figure 4:
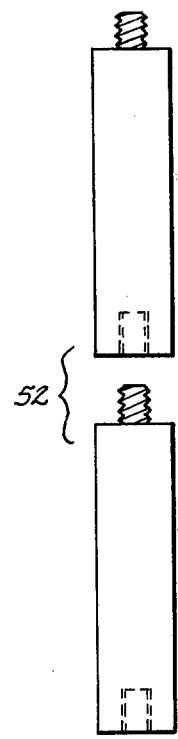
FIG. 4 is an elevation illustrating a pair of extension members for use with apparatus according to the present invention.

A bore 40 is formed in each gauge device which houses a spring 42 which biases the gauge element 26 outwardly. Gauge element 26 is illustrated in the form of a plunger which is spring-loaded by the spring 42. The plunger includes a stem 26a and head portion 26b which is generally of the same diameter of bore 40 to insure a snug, non-wobbling fit and slide therein. The bore 40 is closed by means of a closure cap 44 having a central opening 46 through which the plunger extends. This facilitates removal of the plunger from the bore so that it may be inverted and inserted in the bore 40 as best seen in FIG. 3 for storage when not in use. This avoids damage to the plunger and accurately machined indicia 34 thereon so that the precision of the device is not altered or that the device is not damaged.

As illustrated, each gauge device 16 and 18 includes a first member such as 48 and a second member such as 50 which are removably attached to one another. In use, it is often necessary to work with pipe sections of large diameter which requires large fitting joints which displace the pipe sections from one another. For this purpose extension members 52 may be provided which may be attached between first and second members 48 and 50 of each gauge device to reach the horizontal pipe facilitating use with pipe sections of large diameters.

Indicia 34 is illustrated by quarter-inch markings, however, 1/16 inch markings are preferably included in practice. Markings are read at the flat surface of closure 44.

In use, leg 12 is held in contact with vertical pipe section 32 which is welded to fitting 38. Pipe section 30 is then positioned manually as shown and raised or lowered until the same indicia marking is showing on the plunger at its exit from cap 44 on both devices 16 and 18. This indicates a perpendicular orientation. If it is desired to place a quarter-inch fall, for example, the gauge devices 16 and 18 would be set exactly 12 inches apart and the indicia on the plunger of device 18 would be set one-quarter of an inch more than the plunger of device 16.

While a preferred embodiment of the invention has been described using specific terms, such description is for illustrative purposes only, and it is to be understood that changes and variations may be made without departing from the spirit or scope of the following claims.

What is claimed is:

1. Apparatus for use with a square or like tool in angularly aligning first and second pipe sections for welding and joining of said pipe section in a desired angular orientation relative to one another, said tool being the type having a pair of angularly oriented legs, said apparatus comprising:

a pair of gauge devices;
    means for slidably mounting said gauge devices to a first leg of said tool in a laterally spaced relation;
    each said gauge device including a vertically movable gauge element for engaging said first pipe section in said spaced relation while a second leg of said tool lies against said second pipe section;
    each said gauge element being independently movable in a vertical direction to provide a desired independent vertical displacement from the gauge device from which it extends and provides a measurement of said angular orientation; and
    indicia means carried on said gauge elements for indicating angular alignment of said pipe sections relative to one another so that a joint may be formed to fix said first and second pipe sections in said angular orientation.

2. Apparatus as set forth in claim 1 including a bore formed in each said gauge device, each said gauge element including a spring-loaded plunger received in said bore bearing said indicia means.

3. Apparatus as set forth in claim 2 including a removable closure carried adjacent an end of said bore having an opening through which said plunger extends, said plunger being freely removable from said bore and closure for storage of said plunger in its entirety in said bore when not in use.

4. Apparatus as set forth in claim 1 wherein said gauge device includes a first member slidably carried by said leg and a second member removably attached to said first member, said gauge element being carried by said second member.

5. Apparatus as set forth in claim 4 including an extension member removably attachable between said first and second members facilitating use of said apparatus with pipe sections of different diameters.

6. The apparatus of claim 1 including lock means for locking said gauge devices in a desired position on said leg of said square.

7. The apparatus as set forth in claim 1 including lock means locking said gauge devices against lateral and longitudinal movement relative to said leg.

* * * * *